United States Patent
Alasti et al.

(10) Patent No.: US 11,190,286 B2
(45) Date of Patent: Nov. 30, 2021

(54) NON-TERRESTRIAL NETWORK LINK ADAPTATION

(71) Applicant: DISH WIRELESS L.L.C., Englewood, CO (US)

(72) Inventors: Mehdi Alasti, Reston, VA (US); Siddhartha Chenumolu, Broadlands, VA (US); Mariam Sorond, Reston, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 117 days.

(21) Appl. No.: 16/689,904

(22) Filed: Nov. 20, 2019

(65) Prior Publication Data
US 2021/0058171 A1 Feb. 25, 2021

Related U.S. Application Data

(60) Provisional application No. 62/889,970, filed on Aug. 21, 2019.

(51) Int. Cl.
*H04B 17/336* (2015.01)
*H04B 17/318* (2015.01)
*H04B 17/40* (2015.01)

(52) U.S. Cl.
CPC ......... *H04B 17/336* (2015.01); *H04B 17/318* (2015.01); *H04B 17/404* (2015.01)

(58) Field of Classification Search
CPC ... H04B 17/336; H04B 17/318; H04B 17/404
See application file for complete search history.

(56) References Cited

U.S. PATENT DOCUMENTS

2014/0056335 A1\* 2/2014 Ryu ...................... H04L 1/0015
375/211

FOREIGN PATENT DOCUMENTS

| CN | 107046447 A | 8/2017 |
|---|---|---|
| CN | 105846959 B | 1/2019 |

(Continued)

OTHER PUBLICATIONS

CN 107046447 A (Equipment Inst Pla) (English machine translation), Aug. 15, 2017. (Year: 2017).\*

(Continued)

*Primary Examiner* — Minh Trang T Nguyen
(74) *Attorney, Agent, or Firm* — Seed IP Law Group LLP

(57) ABSTRACT

Systems and methods for communication link adaptation and communication networks involving ground-based user equipment and non-terrestrial stations. A communication is received indicating signal quality of a first signal transmitted during a first transmission period and a plurality of fading losses associated with the first signal are obtained. A first fading loss and a second fading loss associated with the first signal are estimated for a future time, the first fading loss based on application of a first filter, and the second fading loss based on differences determined between the first fading loss and the plurality of fading losses. A signal-to-interference-plus-noise-ratio is calculated and includes at least one of the first fading loss and the second fading loss. A non-terrestrial station transmits, for a second time period, a second signal having settings determined based on the signal-to-interference-plus-noise-ratio.

19 Claims, 10 Drawing Sheets

(56) References Cited

FOREIGN PATENT DOCUMENTS

WO        01/20789 A1    3/2001
WO        03/077444 A1    9/2003

OTHER PUBLICATIONS

3GPP Technical Specification Group radio Access Network; 3GPP TS 38.214 V15.6.0; 2019; 105 pages.

International Search Report and Written Opinion for International Application No. PCT/US2020/047059; dated Nov. 24, 2020; 13 pages.

"$3^{rd}$ Generation Partnership Project; Technical Specification Group Radio Access Network; NR; Physical layer procedures for data (Release 15)," 3GPP TS 38.214 V15.6.0, Technical Specification, Jun. 2019, 105 pages.

\* cited by examiner

NON-TERRESTRIAL NETWORK LINK ADAPTATION

BACKGROUND

Technical Field

The present disclosure relates to communication systems and, more particularly, to communication systems between end user devices and non-terrestrial systems.

Description of the Related Art

In terrestrial networks, the one-way transmission delay is short (on the order of milliseconds) and characteristics of the signal typically do not change significantly during transmission. As a result, a ground-based wireless receiver (e.g., mobile terminal) of the terrestrial system can provide valid indications to a ground-based transmitter (e.g., cell phone tower) regarding quality of the signal transmitted.

In non-terrestrial networks (NTNs), transmission delay is more significant and characteristics of the signal transmitted by a non-terrestrial station, such as a satellite, may change during a transmission period. For instance, a signal transmitted by a satellite in geostationary orbit may have an associated transmission delay of 250 milliseconds or greater. Because of this transmission delay, it is a difficult challenge in NTNs to determine appropriate characteristics for a signal to be transmitted from the non-terrestrial station to a ground-based receiver.

BRIEF SUMMARY

Briefly stated, the present disclosure includes embodiments directed to communications in a non-terrestrial network that includes a non-terrestrial network (NTN) station (e.g., satellite), user equipment (e.g., mobile device), and a terrestrial base station. The NTN station transmits signals during a first transmission period to the user equipment, and the user equipment provides an indication of signal quality to the base station. The base station may evaluate the indication of signal quality and select signal transmission settings for the NTN station.

In some embodiments, the base station may obtain estimates of various fading losses for the signal transmitted to the user equipment. One such fading loss estimate may be a shadow fading estimate obtained by applying a low pass filter to a plurality of fading losses for the transmitted signal. Another fading loss estimate may be a fast fading estimate obtained by determining differences between the plurality of fading losses and the shadow fading estimate. The base station may determine the signal transmission settings based on one or both of the shadow fading estimate and the fast fading estimate.

The signal transmission settings may include settings for modulation and channel coding parameters. In some embodiments, the signal transmission settings may be adjusted in response to receiving communications indicating whether the signal transmissions according to previously adjusted signal transmission settings were successfully or unsuccessfully received by the user equipment. In some instances, the base station may select enhanced signal transmission settings for the NTN station to transmit signals to the user equipment based on successful receipt by the user equipment of a number of signals. In some instances, the base station may select diminished or previous signal transmission settings for the NTN station to transmit signals to the user equipment based on unsuccessful receipt by the user equipment of a number of signals.

DETAILED DESCRIPTION

Technologies disclosed herein are directed toward communication link adaptation in non-terrestrial networks that involve ground-based user equipment and non-terrestrial stations, such as satellites. The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, have not been shown or described in order to avoid unnecessarily obscuring descriptions of the embodiments.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Figure 1:
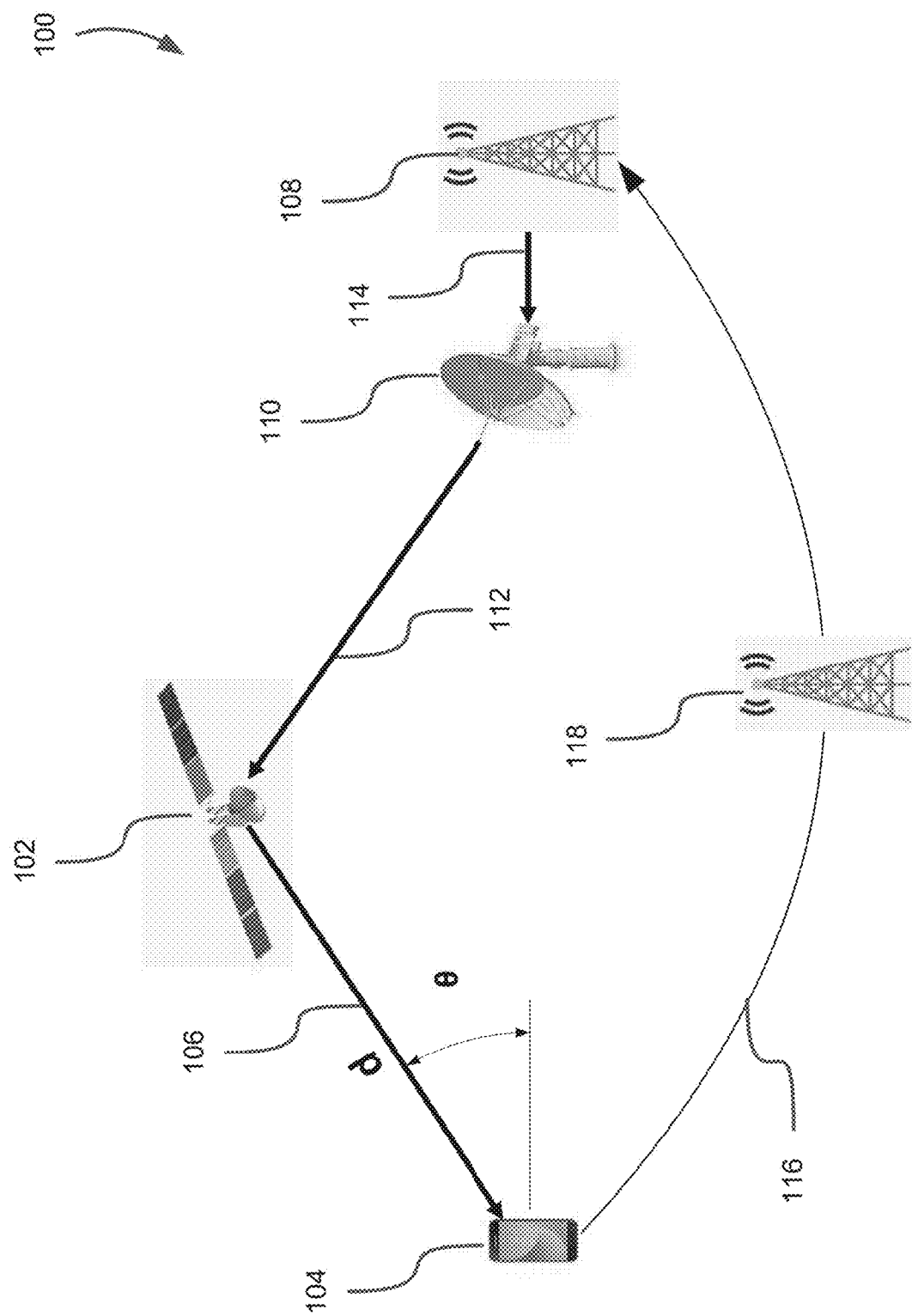
FIG. 1 is a diagram of a non-terrestrial network environment in which a non-terrestrial network station communicates with user equipment.

FIG. 1 shows a non-terrestrial network (NTN) environment 100 in which a non-terrestrial network station (NTN station) 102 communicates with a user equipment (UE) 104 according to one or more embodiments. The NTN station 102 is a satellite, orbiter, or space-based station that orbits the earth or other astronomical object (e.g., planet, moon) in space. The NTN station 102 may be in geostationary orbit (35,000 km), middle earth orbit (7000-25000 km), low earth orbit (300-1500 km), high elliptical orbit (400-50,000 km), or other orbital pattern.

The UE 104 may be a processor-based device on the surface of the earth and that is configured to wirelessly receive communications from the NTN station 102. For instance, the UE 104 may include a communication receiver that is configured to receive and process communications comprising electromagnetic waves emitted by the NTN station 102. The UE 104 may be a satellite phone, a computer system, or mobile device (e.g., cellular phone, tablet computer, internet-of-things device) that is specifically-configured to receive and process communications from the NTN station 102. The UE 104 may include a satellite communication receiver, one or more processors, one or more antennae, and memory storing instructions that, as a result of execution by the one or more processors, cause the UE 104 to perform operations described herein.

In operation, the NTN station 102 sends a set of communication signals 106 to the UE 104 during a transmission period. The NTN station 102 emits the set of communication signals 106 according to certain parameters that affect transmission power $P_T$, fundamental frequency $f_0$, spectrum, modulation, and channel coding, by way of non-limiting example. The communication signals 106 may be transmitted over a distanced separating the NTN station 102 and the UE 104. An elevation angle θ of the communication signals 106 defies an angle between the horizon of the earth (or astronomical object) and a line-of-sight between the NTN station 102 and the UE 104. The quality of the communication signal 106 that is received by the UE 104 may be affected by various conditions or objects, such as mountains, hills, trees, buildings, cars, aircraft, etc., located along or adjacent to the line-of-sight between the NTN station 102 and the UE 104.

A terrestrial base station 108 located on the ground may control aspects of communication signal transmission by the NTN station 102. In particular, the base station 108 comprises or has associated therewith a computer system that includes one or more processors and memory storing a set of instructions that, as a result of execution by the one or more processors, cause the base station 108 to perform the operations described herein. Some of the one or more processors and at some of the memory may collectively form a controller that controls content and transmission characteristics (e.g., modulation and channel coding parameters, power, frequency) of communications transmitted within the NTN environment 100.

The NTN environment 100 may include a terrestrial backhaul or satellite gateway 110 that serves as an intermediate link between the NTN station 102 and the base station 108. In particular, the satellite gateway 110 transmits communication signals 112 to the NTN station 102 indicating content and/or characteristics of the communication signals 106 to be sent by the NTN station 102 to the UE 104. The base station 108 may transmit or cause to be transmitted communication signals 114 to the satellite gateway 110 that cause the satellite gateway 110 to transmit corresponding communication signals 112 to the NTN station 102. The communication signals 114 may be sent wirelessly and/or by wired connection to the satellite gateway 110, and the communication signals 112 may be sent wirelessly (e.g., via radio frequency communications, via optical signals) to the NTN station 102. The satellite gateway 110 may include a transmitter and antenna components (e.g., parabolic antenna) configured to wirelessly transmit the communication signals 114 to the NTN station 102.

The NTN station 102 transmits the communication signals 106 to the UE 104 based on the communication signals 112 received from the satellite gateway 110. Specifically, the NTN station 102 may transmit communication signals 106 according to modulation and coding channel parameters indicated in the communication signals 112. The UE 104 may analyze characteristics (e.g., signal strength, frequency) of the communication signals 106 received from the NTN station 102 and, as a result of the analysis, transmit communications that affect how the NTN station 102 is to transmit future communications by the NTN station 102 to the UE 104. For instance, based on results of the analysis of the communication signals 106 by the UE 104, the UE 104 may transmit a communication signal 116 representative of characteristics of the communication signals 106 received from the NTN station 102. In some embodiments, the communication signal 116 may be received by one or more intermediate stations 118, which propagate the communication signal 116 to reach the base station 108. The base station 108, may cause the NTN station 102 to transmit further communication signals 106 having transmission characteristics, such as power, modulation, and/or channel coding, based on information in the communication signals 116 provided by the UE 104. The intermediate stations 118 may be ground-based transmitters that transmit or repeat the communication signals 116 received thereby.

A quality of the communication signal 106 received by the UE 104 is a function of the signal-to-interference-plus-noise-ratio (SINR). In particular, the SINR may be defined by the following equation:

$$SINR(x) = \frac{P_{UE}}{I+N} \qquad [1]$$

wherein x is the communication signal 106, $P_{UE}$ is the power received at the UE 104, I is interference, and N is noise. The power received $P_{UE}$ is a function of the transmit power $P_T$, path loss PL, and other losses OL. The path loss PL is a function of the distance d and the fundamental frequency $f_0$ of the signal 106. Therefore, the SINR can be expressed by the following equation:

$$SINR(x) = \frac{\left(\frac{P_T}{(PL(d, f_0) + OL)}\right)}{I + N} \quad [2]$$

A significant challenge in non-terrestrial networks is that it is a challenging and complex problem to appropriately adjust parameters of the signal 106 transmitted to account for changes affecting the quality of the signal 106 during transmission. However, the technologies disclosed herein facilitate link adaptation of communications between the NTN station 102 and the UE 104 to account for such changes.

The NTN environment 100 may include additional components or systems not described or depicted with respect to FIG. 1. Those skilled in the art will appreciate that inclusion of such components or systems do not affect the scope of the present disclosure.

Figure 2:
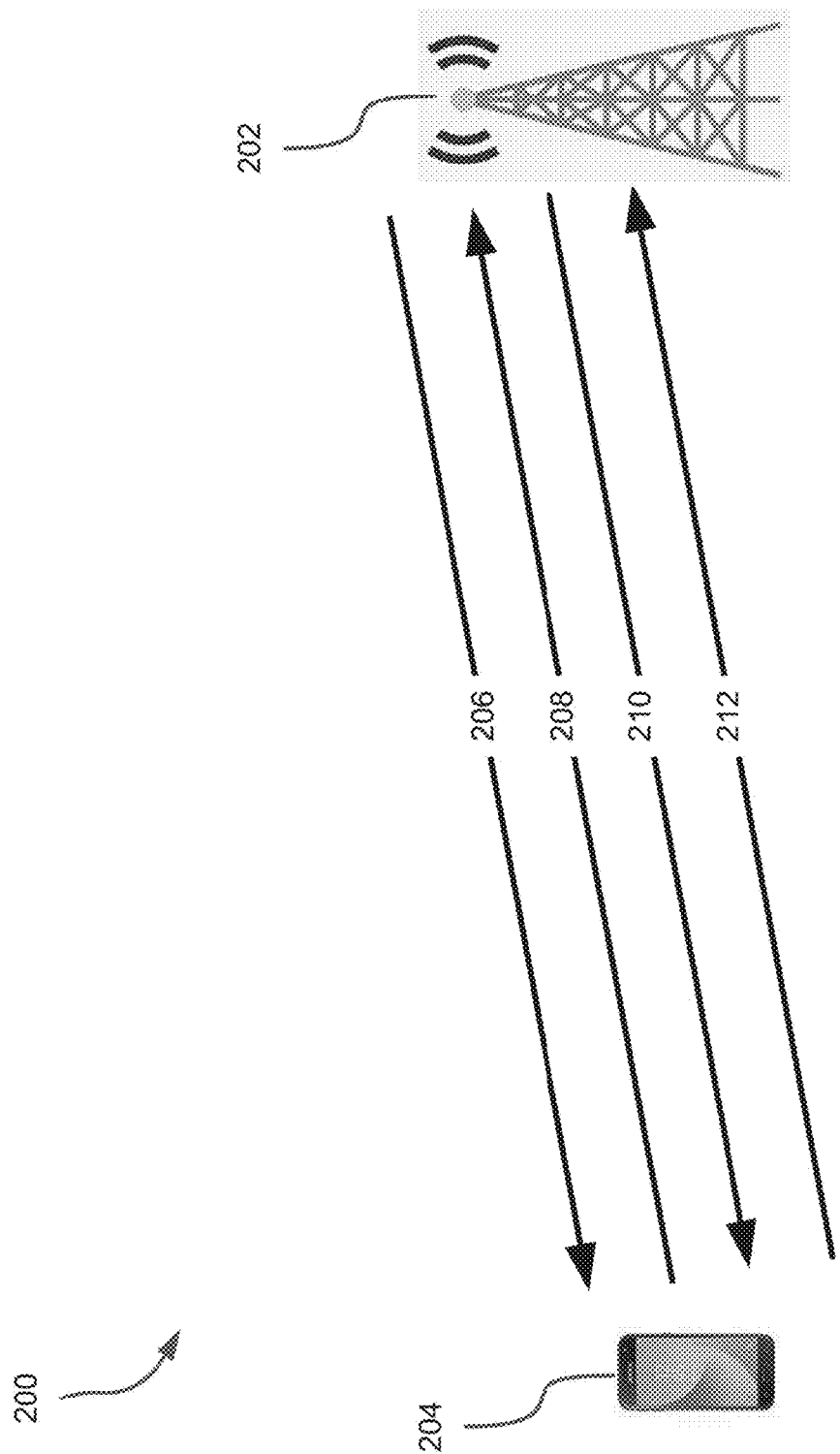
FIG. 2 is a diagram of a wireless network environment in which a terrestrial base station wirelessly communicates with user equipment.

FIG. 2 shows a wireless network environment 200 in which a terrestrial base station 202 wirelessly communicates with a UE 204 according to one or more embodiments. The terrestrial base station 202 is a ground-based system that includes a wireless transmitter, a wireless receiver, and a processor or controller configured to adjust parameters of signal transmissions by the terrestrial base station 202 to the UE 204 based on channel quality feedback provided by the UE 204. The UE 204 is a processor-based device (e.g., mobile terminal) that is configured to wirelessly communicate over terrestrial wide area networks, such as cellular data networks.

Operations for adjusting parameters of signal transmission will now be described with respect to the wireless network environment 200. The terrestrial base station 202 sends a first signal 206 to the UE 204. The UE 204 measures the SINR of the first signal 206 and sends a second signal 208 to the terrestrial base station 202 that includes a channel quality indicator (CQI) regarding the first signal 206. The CQI provides an indication regarding quality of the communication signal received and may include an estimate of signal transmission parameters that may result in improved communication quality.

The base station 202 determines whether to adjust signal transmission parameters based on the CQI. If so, the base station 202 may determine a new set of signal transmission parameters to implement for additional signal transmissions. The base station 202 may determine which parameters to adjust and how to adjust the parameters based on the CQI. The parameters to adjust may include signal power, modulation, and channel coding; however, other signal parameters may be adjusted if appropriate. Thereafter, the base station 202 may send a third signal 210 to the UE 204 according to the new set of signal transmission parameters determined. The UE 204 receives and evaluates the third signal 210, and may transmit a fourth signal 212 in response. To evaluate the third signal 210, the UE 104 may verify whether third signal 210 satisfies a defined criterion indicating was successful receipt of content in the third signal 210. For instance, the UE 104 may determine whether the third signal 210 includes data that is corrupted or that cannot be processed or recognized. As another example, the UE 104 may evaluate the signal integrity by comparing a first value (e.g., hash value, checksum) included as content in the third signal 210 with a second value generated by the UE 204 using content in the third signal 210.

As a result of successfully verifying the third signal 210, the UE 204 may transmit, as part of the fourth signal 212, an indication of successful receipt of the third signal 210 (an acknowledgement or ACK signal). On the other hand, as a result of a failure to successfully verify the third signal 210, the UE 204 may transmit, as part of the fourth signal 212, and indication of unsuccessful receipt of the third signal 210 (negative-acknowledgment or NACK signal). The indication of unsuccessful receipt may indicate to the base station 202 that an error was detected in connection with the third signal 210 transmission. Accordingly, the base station 202 may further adjust the transmission parameters and transmit additional signals to the UE 204 using the adjusted transmission parameters.

Adjusting parameters in the wireless network environment 200 is feasible because the delay between transmission of a signal by the base station 202 and receipt of the signal by the UE 204 is short. Thus, the base station 202 can appropriately adjust transmission parameters as necessary to facilitate successful signal transmission and reception. Due to the delay and other factors associated with NTNs, responsively adjusting signal transmission parameters of signals transmitted by the NTN station 102 to the UE 104 to account for changes in communication quality is a difficult problem. However, the technologies disclosed herein facilitate link adaptation in an NTN to appropriately adjust signal transmission parameters, thereby improving the quality of communication and/or reducing an amount of power consumed by an NTN station 102 in connection with signal transmissions to the UE 104.

Figure 3:
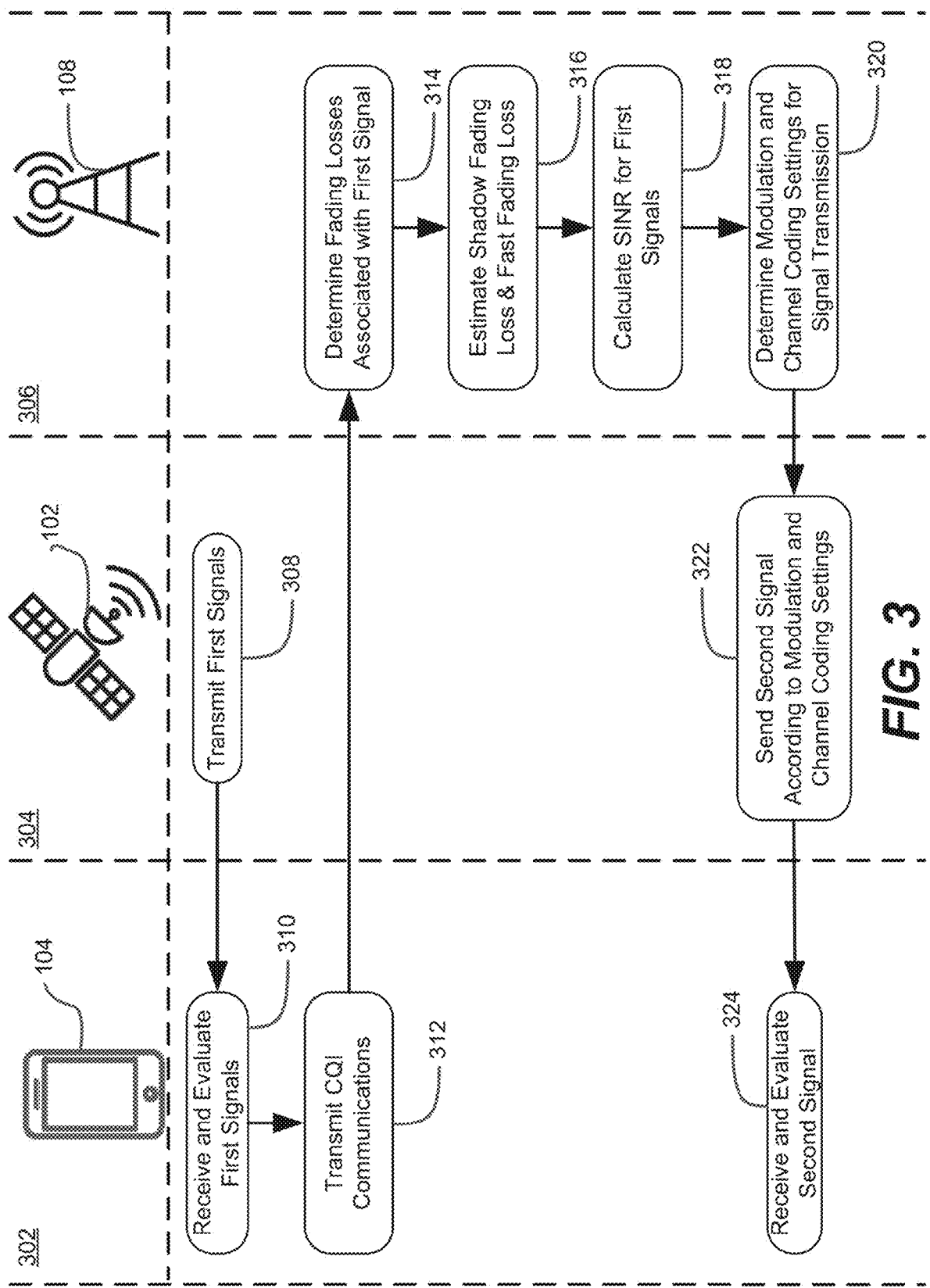
FIG. 3 is a flowchart of a first communication process in which components of the non-terrestrial network environment of FIG. 1 communicate to adapt a communication link between the non-terrestrial network station and the user equipment according to one or more embodiments.

FIG. 3 shows a communication process performed involving the NTN station 102, the UE 104, and the base station 108 according to one or more embodiments. The communication process includes operations 302 performed by the UE 104, operations 304 performed by the NTN station 102, and operations 306 performed by the base station 108. The NTN station 102 transmits 308 a plurality of first signals to the UE 104 during a first transmission period. The first signals may be communications signals transmitting information content, which may vary between signals. The NTN station 102 transmits the first signals according to first settings for signal transmission parameters, which may include transmission power, modulation, and channel coding. The UE 104 receives and evaluates 310 the first signals from the NTN station 102. There is a time delay period D between a time when the NTN station 102 transmits the first signals and a time period $TP_1$ at which the UE 104 receives the first signals at 310.

The UE 104 evaluates the first signals and generates a CQI regarding characteristics of the first signals, such as SINR. The UE 104 also obtains location information regarding a location of the UE 104, e.g., via global positioning system (GPS), for the time period $TP_1$ at which the first signals were received. The location information may indicate or be useable to determine latitude and longitude of the UE 104 during the time period $P_1$. Thereafter, the UE 104 transmits 312 communications to the base station 108 providing the CQI(s) determined for the first signals and the location information of the UE 104 during the time period $P_1$. At a time $t_1$ after the time period $TP_1$, the communication is received by the base station 108, which processes the communication to determine information regarding the first signal.

The base station 108 evaluates the communication and determines transmission parameter settings to be implemented by the NTN station 102 for future signal transmissions to the UE 104. The base station 108, based on the location information, determines the distanced between the UE 104 and the NTN station 102 when the first signals were received 310 by the UE 104. The base station 108 also determines the elevation angle θ of the UE 104 relative to the NTN station 102 and may determine the morphology of land and architecture around the UE 104. The base station 108, for instance, may determine whether the UE 104 is in an urban region occupied by tall buildings, a mountainous rural setting, or a more exposed setting, such as a field or body of water. The base station 108 may also determine transmission characteristics associated with the first signals, such as the transmission power $P_T$, the fundamental frequency $f_0$ of the first signals, the noise N, and/or the interference I associated with the first signals. Determining 314 the fading losses may include obtaining information indicating the noise N and the interference I from the NTN station 102 (e.g., via the satellite gateway 110) and/or from the UE 104 (e.g., via intermediate station(s) 118).

The base station 108 may use the information obtained and/or generated to determine 314 fading losses associated with the first signals. The base station 108 may determine path loss PL as a function of the distance d and the fundamental frequency $f_0$. The base station 108 also determines the fading losses for the first signals. Previous fading losses may be determined as F(t–D), F(t–D–s), F(t–D–2s), . . . , F(t–D–Ns), wherein N is a positive integer corresponding to a number of evaluations of the first signals provided in the CQI communication(s), t is a time at which the first signals were received by the base station 108, D is a time delay between when the CQI transmissions were sent by the UE 104 and when the base station 108 received the CQI transmissions, and s is a time granularity (e.g., time between samples). A current fading loss is represented as F(t)=SF(t)+FF(t), wherein SF(t) is an estimated shadow fading loss for a time t and FF(t) is an estimated fast fading loss for the time t.

Then, the base station 108 estimates 316 the shadow fading loss SF for the time t and the fast fading loss FF for the time t. Further description for estimating shadow fading loss SF and the fast fading loss FF is provided elsewhere herein. Thereafter, the base station 108 may calculate 318 the SINR for the first signals transmitted during the first transmission period. Calculating 318 may include considering the shadow fading estimate SF and the fast fading estimate FF as being the other losses OL described with respect to Equation 2. By estimating the shadow fading losses SF and the fast fading losses FF, the base station 108 may assess the SINR of the first signals according to Equation 2, where the remaining components are known, already determined, or otherwise obtained by the base station 108.

Based on the SINR calculated, the base station 108 then determines 320 modulation and channel coding (MCS) settings for future signal transmission by the NTN station 102. In particular, the base station 108 may assess whether the SINR calculated in 318 is within a defined acceptable range. An SINR that exceeds the defined range may indicate that settings for the signal transmission parameters are excessive. For instance, an SINR exceeding the defined range may indicate that the transmission power $P_T$ is higher than necessary to achieve a desired SINR, or may indicate that the modulation and channel coding settings are excessive. On the other hand, an SINR that is lower than a desired SINR range may indicate that the signal transmission parameters are insufficient to achieve an SINR within the defined range (e.g., above a lower limit in the defined range). In either situation, different settings for the modulation and channel coding parameters of the NTN station 102 may be selected to achieve an SINR that is within the defined range for signal transmission.

The base station 108 then causes the NTN station 102 to send 322 a second signal according to the UE 104 according to the MCS parameter settings determined in 320. For instance, the NTN station 102 may send a communication to the NTN station 102 via the satellite gateway 110 that specify the MCS settings according to which the NTN station 102 is to send future signals to the UE 104. Thereafter, the NTN station 102 sends 322 second signals to the UE 104 according to the MCS settings specified. The UE 104, at 324, receives the second signal from the NTN station 102 and may obtain communication content therefrom. The UE 104 may evaluate characteristics of the second signal, such as CQI, and report results of the evaluation back to the base station 108 as described elsewhere herein. In some instances, in response to receiving and evaluating the second signal in 324, the UE 104 may send acknowledgment signals to the base station 108 indicating whether the second signal was successfully or unsuccessfully received.

Figure 4:
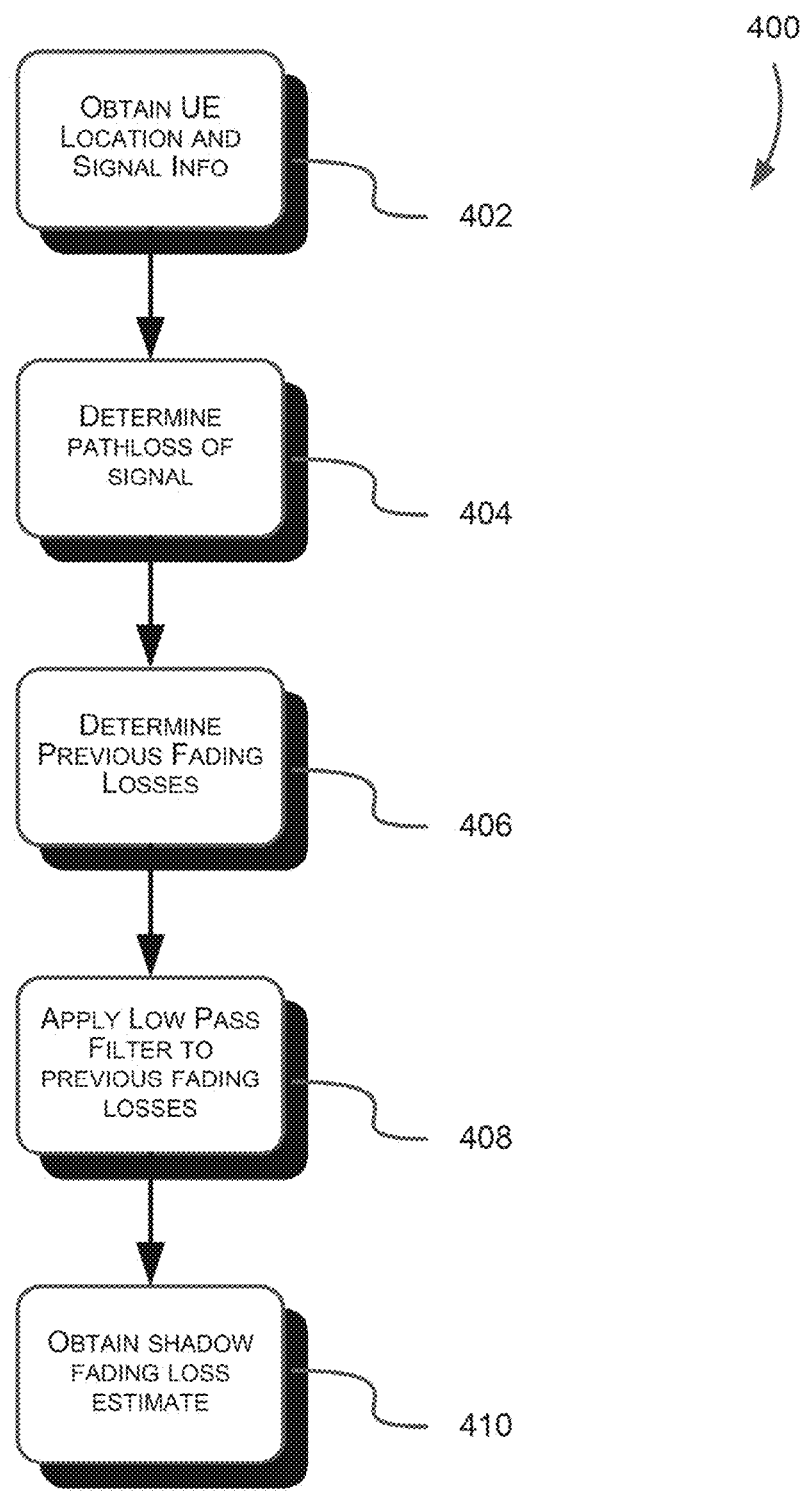
FIG. 4 is a flowchart of a method for estimating shadow fading losses in the non-terrestrial network environment of FIG. 1.

FIG. 4 shows a method 400 for estimating shadow fading losses associated with signal transmission from the NTN station 102 to the UE 104 according to one or more embodiments. The method 400 may be performed by the base station 108 in connection with communications provided by the UE 104. The method 400 may be part of estimating 316 shadow fading losses and fast fading losses of a transmitted signal. The method 400 includes obtaining 402 location information regarding a location of the UE 104 when a signal is received by the UE 104 at a first time and information regarding the signal sent from the NTN station 102 to the UE 104. The location of the UE 104 may be determined by receiving GPS information from the UE 104, such as latitude and longitude information. In some embodiments, terrain morphology, elevation, and/or elevation angle θ may be ascertained based on a location determined for the UE 104. The distanced between the NTN station 102 and the UE 104 may be determined based on a known location of the NTN station 102 and the location information of the UE 104 ascertained. The signal information obtained by the base station 108 may include the fundamental frequency $f_0$ of the signal transmitted to the UE 104, the interference I, the noise N, and the transmission power $P_T$ of the signal transmitted to the UE 104.

At 404, the method 400 includes determining 404 path loss PL of the signal transmitted to the UE 104 by the NTN station 102. The path loss PL is a function of the distance d and the fundamental frequency $f_0$ obtained in 402. Thereafter, the method 400 includes determining 406 previous fading losses of signals transmitted from the NTN station 102 to the UE 104 during a transmission period. As described above with respect to FIG. 3 and elsewhere herein, previous fading losses $FL_P$ may be determined as a series of discrete signal losses $$FL_P = F(t-D), F(t-D-s), F(t-D-2s), \ldots, F(t-D-Ns)$$

wherein N is a positive integer corresponding to a number of evaluations of the first signals provided in the CQI communication(s), t is a time at which the first signals were received by the base station 108, D is a time delay between when the CQI transmissions were sent by the UE 104 and when the base station 108 received the CQI transmissions, and s is a time granularity (e.g., time between samples).

Figure 5:
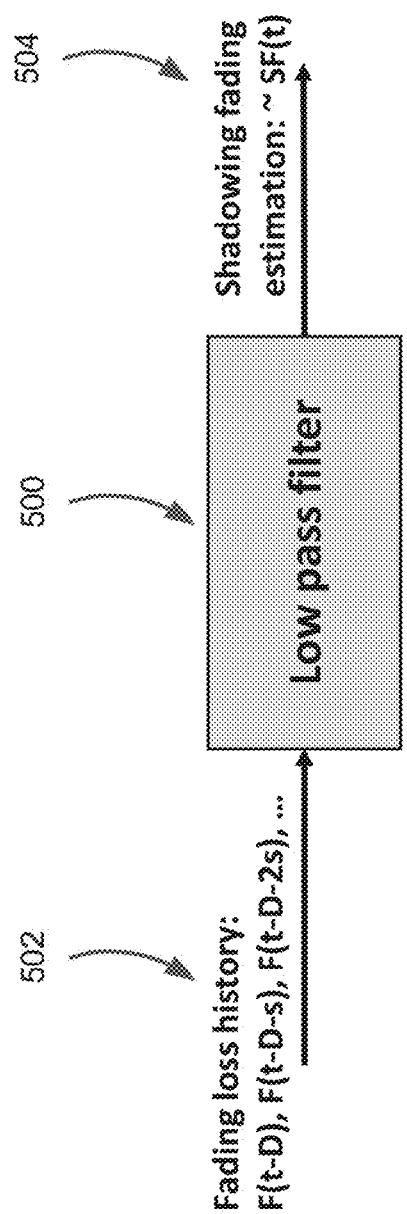
FIG. 5 is a diagram showing operation of a low pass filter used in connection with the method of FIG. 4.

The method 400 includes applying 408 a low pass filter to the fading losses determined in 406. FIG. 5 shows an example of the low pass filter applied to the previous fading losses $FL_P$. A low pass filter 500 is a function implemented in hardware and/or software of the base station 108. The low pass filter 500 receives the previous fading losses $FL_P$ as a set of inputs 502 and outputs a shadow fading estimate $SF_E$ 504 for a time t, which may be a time after the time the signal was received by the UE 104. The low pass filter 500 may apply an exponential average function to the previous fading losses $FL_P$ or apply an exponential moving average function to the previous fading losses $FL_P$. The shadow fading losses are generally slowly changing losses on a time scale in which signals are transmitted by the NTN station 102 and received by the UE 104, so applying the low pass filter 500 filters the "faster" changing losses from the previous fading losses $FL_P$ and leaving the shadow fading estimate $SF_E$ 504 for the time t. The shadow fading loss estimate $SF_E$ 504 may be obtained in 410 from the output of the low pass filter 500.

Figure 6:
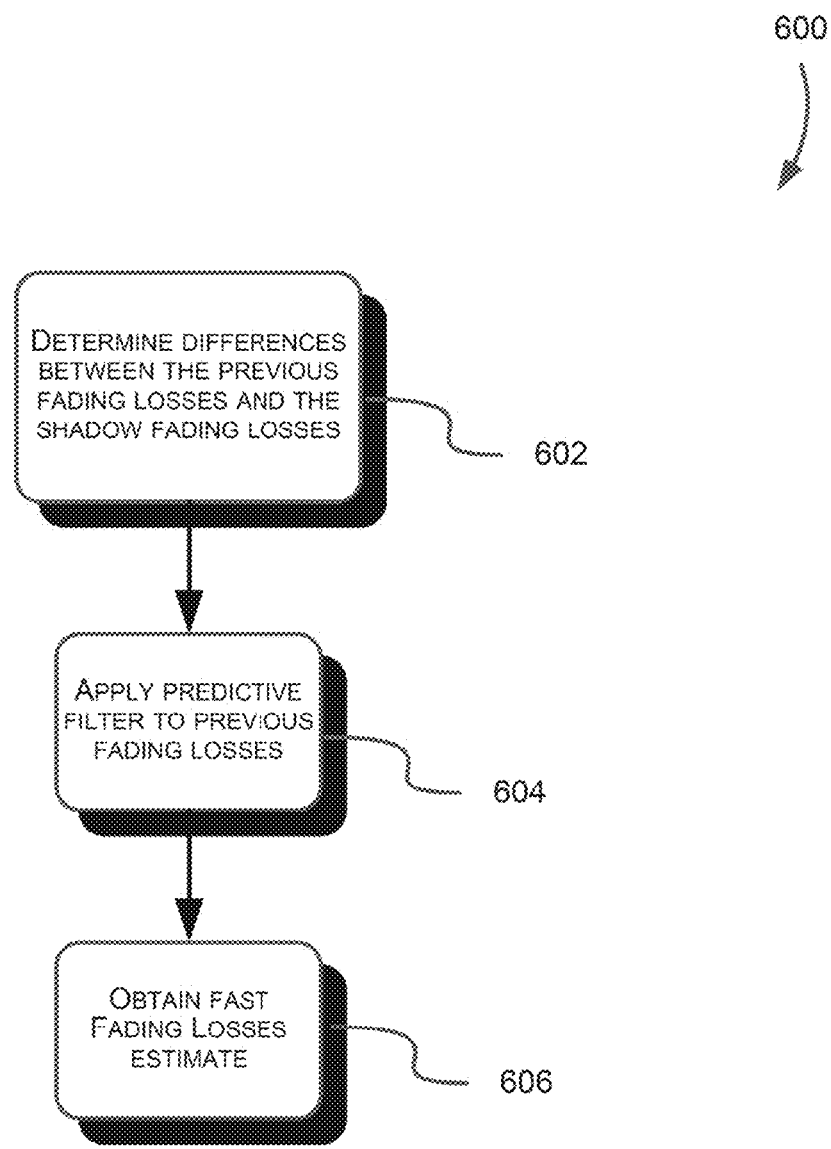
FIG. 6 is a flowchart of a method for estimating fast fading losses in the non-terrestrial network environment of FIG. 1.

FIG. 6 shows a method 600 for estimating fast fading losses associated with signal transmission from the NTN station 102 to the UE 104 according to one or more embodiments. The method 600 may be performed by the base station 108 in connection with communications provided by the UE 104. The method 600 may be part of estimating 316 shadow fading losses and fast fading losses of a transmitted signal and is performed subsequent to and in connection with the method 400. The method 600 includes determining 602 differences between the previous fading losses and the shadow fading losses. In particular, the fading loss of the transmitted signal may be defined in Equation 3 as follows:

$$FL(t) = SF(t) + FF(t) \quad [3]$$

wherein FL(t) defines the fading losses associated with the transmitted signal at a particular time t, SF(t) defines the shadow fading losses associated with the transmitted signal at the particular time t, and FF(t) defines the fast fading losses associated with the transmitted signal at the particular time t.

A set of previous fast fading losses $FF_P$ for a time period before a time t can be obtained by subtracting the shadow fading losses estimate $SF_E$ 504 from each of the fading losses $FL_P$ discussed above as follows:

$$FF_P(t_1) = FL_P(t_1) - SF_E;$$

$$FF_P(t_2) = FL_P(t_2) - SF_E;$$

$$\ldots$$

$$FF_P(t_N) = FL_P(t_N) - SF_E \quad [4]$$

wherein $FL_P$ is the fading loss for a time before the time t, $SF_E$ is the shadow fading estimate obtained in 504, and N is a number of fading losses determined in 406.

Figure 7:
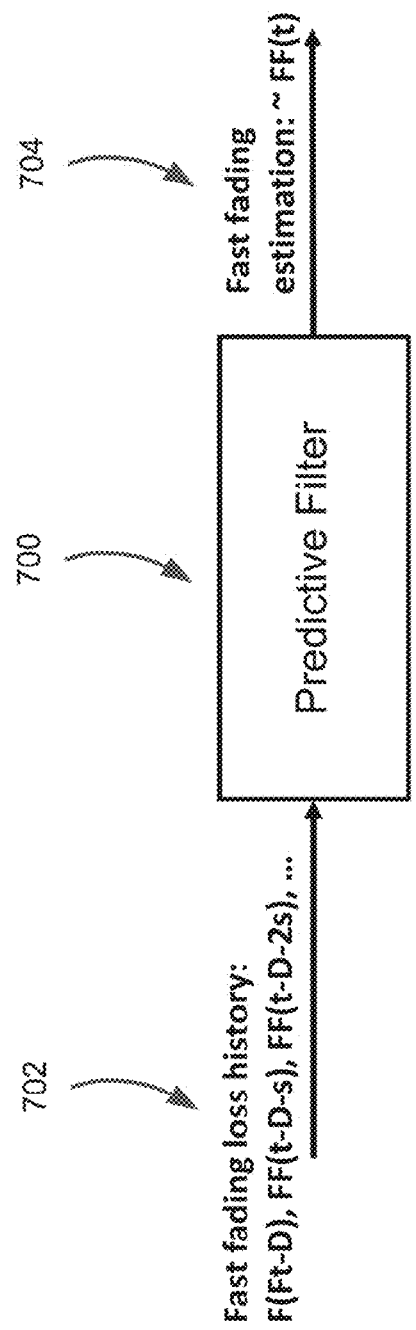
FIG. 7 is a diagram showing operation of a predictive filter used in connection with the method of FIG. 6.

The previous fast fading losses $FF_P$, corresponding to differences between the previous fading losses $FL_P$ and the shadow fading estimate $SF_E$, is used to obtain a fast fading estimate $FF_E$. In particular, the method 600 includes applying 604 predictive filter to the previous fast fading losses $FF_P$ determined in 602. FIG. 7 shows an example of a predictive filter 700 applied to previous fast fading losses $FF_P$. The predictive filter is a function implemented in hardware and/or software of the base station 108. The predictive filter 700 receives the previous fast fading losses $FF_P$ as a set of inputs 702 and outputs a fast fading loss estimate $FF_E$ for the time t. The predictive filter 700 may be a Kalman filter or linear quadratic estimation filter that recursively estimates a value for the $FF_E$ at the time t based on the set of inputs 702. The previous fast fading losses $FF_P$ may have a Gaussian distribution, which can make the Kalman filter an appropriate implementation for the predictive filter 700. Examples of other predictive filters include particle filters and Bayesian State filters. The method 600 concludes at 606 wherein the fast fading estimate $FF_E$ 704 is obtained from the predictive filter 700.

Figure 8:
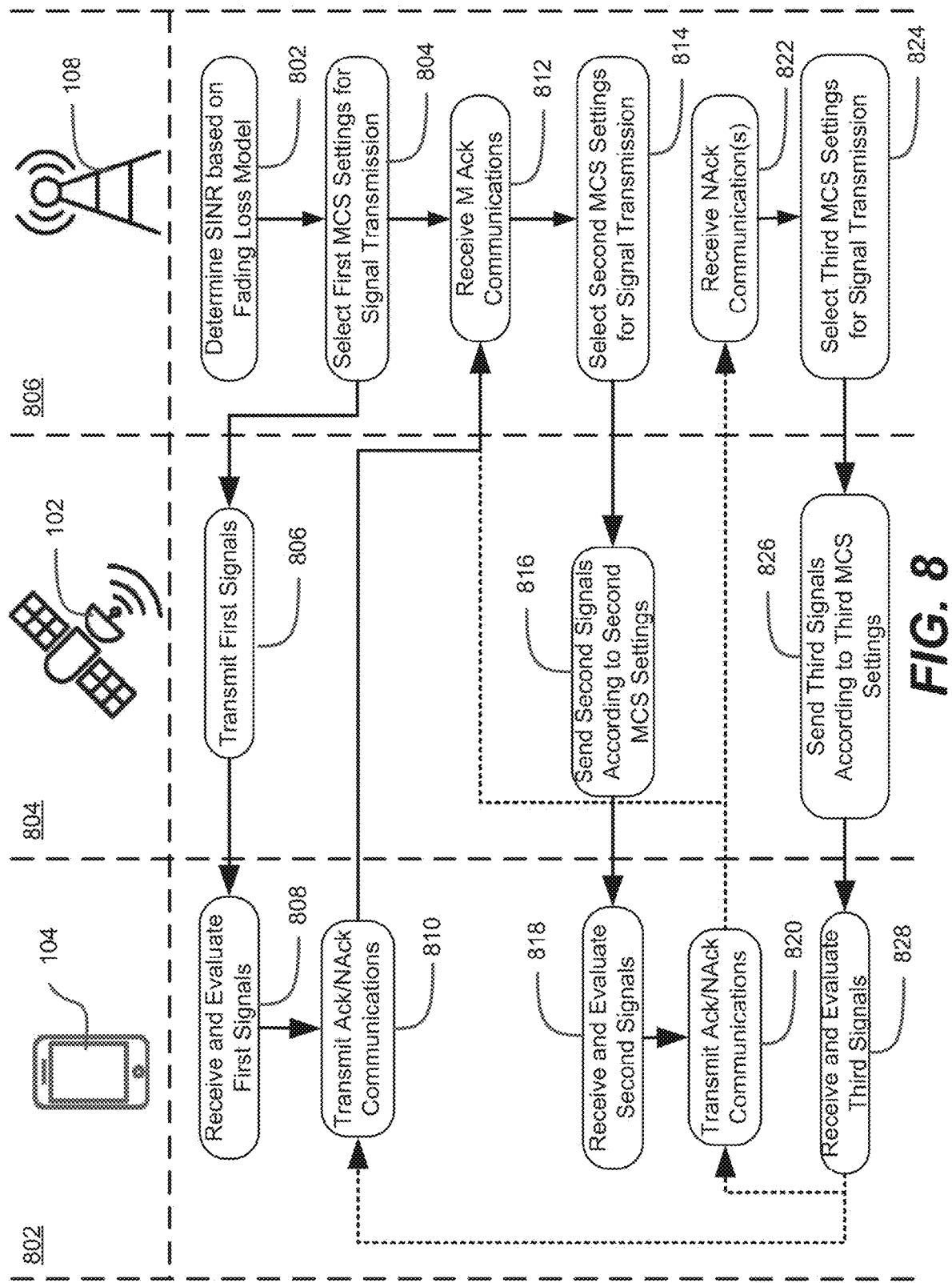
FIG. 8 is a flowchart of a second communication process in which modulation and channel coding settings are adjusted in the non-terrestrial network environment of FIG. 1.

The fast fading estimate $FF_E$ and/or the shadow fading estimate $SF_E$ may be used to adapt a communication link between the NTN station 102 and the UE 104 using various MCS settings. FIG. 8 shows a communication process involving the NTN station 102, the UE 104, and the base station 108 according to one or more embodiments. The communication process includes operations 302 performed by the UE 104, operations 304 performed by the NTN station 102, and operations 306 performed by the base station 108. The communication process of FIG. 8 may be performed subsequent to performance of the methods 400 and 600.

The communication process includes determining 802 the SINR of signals transmitted from the NTN station 102 to the UE 104 based on a fading loss model. The communication process may implement a conservative fading loss model $SINR_{con}$ in which it is assumed that the shadow fading losses and the fast fading losses will not exceed statistically calculated models for the other losses OL. That is, a statistical model may be used to calculate conservative values for the shadow fading losses $SF_{con}$ and the fast fading losses $FF_{con}$. The conservative values for the shadow fading losses $SF_{con}$ and the fast fading losses $FF_{con}$ are worst case fading loss values which may be determined based on a statistical model that implements various factors, including the distance d, the terrain morphology around the UE 104, and the elevation angle θ, by way of non-limiting example. The conservative model $SINR_{con}$ may be obtained without previously performing the communication process of FIG. 3, the method 400, or the method 600. The conservative SINR model is shown as follows:

$$SINR_{con} = \frac{\left(\frac{P_T}{(PL(d, f_0) + SF_{con} + FF_{con})}\right)}{I + N} \quad [5]$$

The communication process may implement a second model, a slow tracking model $SINR_{slow}$, in which the shadow fading estimate $SF_E$ obtained in 410 and the conservative fast fading value $FF_{con}$ are used in the SINR model. The slow tracking model $SINR_{slow}$ may be obtained after performance of the method 400 and without performance of the method 600. The slow tracking model accounts for the effect of shadow fading artifacts in the SINR that change slowly over time. The slow tracking model $SINR_{slow}$ is shown as follows:

$$SINR_{Slow} = \frac{\left(\frac{P_T}{(PL(d, f_0) + SF_E + FF_{con})}\right)}{I + N} \quad [6]$$

The communication process may implement a third model, a fast tracking model SINR$_{Fast}$, in which the shadow fading estimate SF$_E$ obtained in 410 and the fast fading estimate FF$_E$ are used in the SINR model. The fast tracking model SINR$_{Fast}$ may be obtained subsequent to performance of the method 400 and the method 600. The fast tracking model accounts for the effect of fast moving artifacts in the SINR that change quickly over time and accounts for the effect of shadow fading artifacts in the SINR that change slowly over time. The fast tracking model SINR$_{Fast}$ is shown as follows:

$$SINR_{Fast} = \frac{\left(\frac{P_T}{(PL(d, f_0) + SF_E + FF_E)}\right)}{I + N} \quad [7]$$

After a fading loss model is determined in 802, the base station 108 selects 804 first MCS settings for signal transmission. The MCS settings selected in 804 represent the most spectral-efficient MCS that can be decoded by the relevant UE 104 with a block error rate (BLER) of less than 10% based on the SINR measurement by the UE 104. The MCS settings may be selected from among those indicated, for example, in Tables 5.1.3.1-1, 5.1.3.1-2, and 5.1.3.1-3, the Technical Specification Group Radio Access Network 38.214, version 15.6.0, released in June 2019 by the Third Generation Partnership Project (3GPP) (hereinafter "3GPP New Radio Specification"). The Tables 5.1.3.1-1, 5.1.3.1-2, and 5.1.3.1-3 may be related to CQI provided by the UE 104 according to Tables 5.2.2.1-2, 5.2.2.1-3, and/or 5.2.2.1-4 of the 3GPP New Radio Specification; however, those of skill in the art will appreciate that the MCS settings may be selected in 804 according to other relationships between loss, efficiency, CQI, etc., without departing from the scope of the present disclosure.

Thereafter, the NTN station 102 transmits a first signal to the UE 104 according to MCS settings selected by the base station 108 in 804. The UE 104 receives and evaluates 808 the first signals, as described above with respect to the communication process of FIG. 3, such as by verifying successful receipt of the first signals, as described with respect to FIG. 2 and elsewhere herein The UE 104 may evaluate a plurality of the first signals in 808 and transmit 810 acknowledgement (Ack) communications or negative-acknowledgement (NAck) communications to the base station 108 representative of an evaluation result of one or more of the first signal evaluations. An ACK signal indicates that a corresponding first signal was successfully received, e.g., based on the absence of corrupt data content in the first signal or on based on a match between values associated with the first signal. A NAck signal, by contrast, indicates that a corresponding first signal was unsuccessfully received, e.g., based on the presence of corrupt data content in the first signal or a mismatch between values associated with the first signal.

The base station 108 may receive 812 M consecutive Ack communications transmitted by the UE 104, wherein M is a positive integer exceeding a defined threshold for a number of successful signal transmissions that indicate the selected first MCS settings are stable and/or reliable during the signal transmission period. As a result of receiving 812 M Ack communications, the base station 108 selects 814 second MCS settings for signal transmission that are different than the first MCS settings. The second MCS settings may be enhanced MCS settings that have improved operational characteristics for the NTN station 102—for example, characteristics that cause the NTN station 102 to consume a reduced amount of power in connection with signal transmission to the UE 104 or characteristics that facilitate broader successful communication with a larger number of UEs that include the UE 104.

Thereafter, the base station 108 causes the NTN station 102 to transmit 816, during a second transmission period, second signals to the UE 104 according to the second MCS settings selected in 814. The UE 104 receives and evaluates 818 second signals transmitted according to the second MCS settings. As a result of the evaluation, the UE 104 transmits 820 Ack signals and/or NAck signals to the base station 108 indicating successful or unsuccessful receipt of the second signals, as described elsewhere herein.

The base station 108 may receive 822 a number of NAck communications from the UE 104 that cause the base station 108 to reselect MCS settings of the NTN station 102. For instance, the base station 108 may adjust the MCS settings as a result of receiving a single NAck signal or as a result of receiving a plurality of consecutive NAck signals that exceed a defined threshold stored in memory of the base station 108. In response, the base station 108 may select 824 third MCS settings for signal transmission that are different than the second MCS settings. The third MCS settings, for instance, may represent more conservative values that improve the likelihood that the UE 104 will successfully receive and process signal transmissions.

The base station 108 then causes the NTN station 102 to transmit a 26 third signals according to the third MCS settings selected, as described elsewhere herein. The UE 104 receives and evaluates 828 the third signals transmitted according to the third MCS settings. Based on a result of the evaluations the UE 104 may transmit Ack signals or NAck signals to the base station 108, which may readjust or reselect the MCS settings based on the number of consecutive Ack or NAck signals received.

Figure 9:
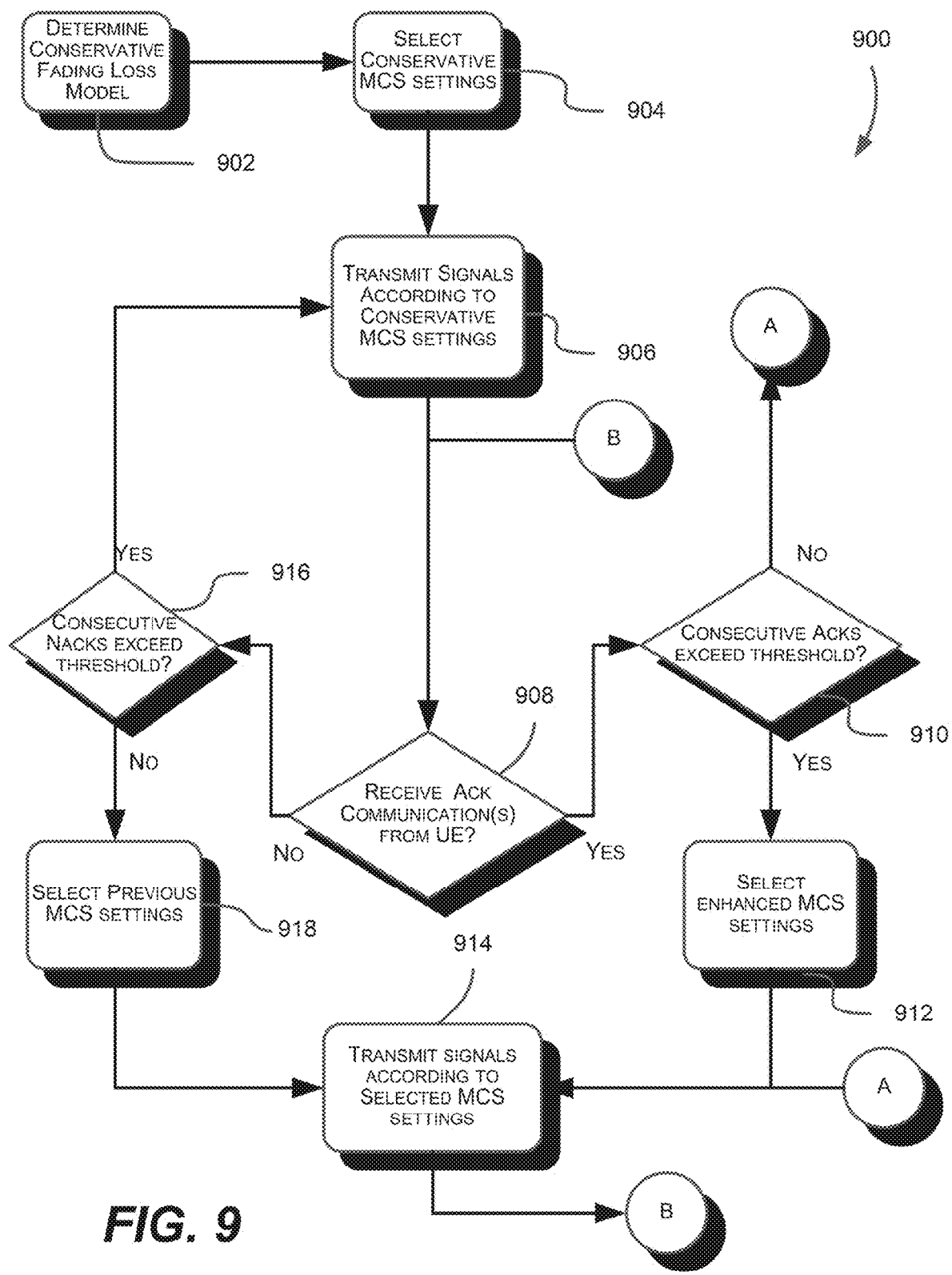
FIG. 9 is a flowchart of a method for adapting a communication link between the non-terrestrial network station and the user equipment of FIG. 1 according to one or more embodiments.

FIG. 9 shows a method 900 for adapting communication link between the UE 104 and the NTN station 102 according to one or more embodiments. The method 900 may be performed by the base station 108 in connection with communications with the UE 104 and the NTN station 102. The method 900 includes determining 902 a conservative fading loss model, as described with respect to 802 of the communication process and elsewhere herein. In particular, the conservative fading loss model determined in 902 corresponds to the SINR$_{con}$ of Equation 6. Based on the conservative fading loss model determined 902, the method includes selecting 904 conservative MCS settings for signal transmission by the NTN station 102, such as those identified with respect to the 3GPP New Radio Specification.

The method 900 includes causing 906 the NTN station 102 to transmit signals according to the conservative MCS settings—for instance, by the base station 108 sending a communication to the NTN station 102 specifying the conservative MCS settings for a future signal transmission period. Thereafter, the method 900 includes determining 908 whether a communication received by the base station 108 from the UE 104 is an Ack signal indicating successful transmission of the signals transmitted by the UE 104.

If so, the method 900 includes determining 910 whether a number of consecutively received Ack signals exceeds a defined threshold stored in the base station 108 that indicates that the selected MCS settings for signal transmission are stable and/or reliable during the signal transmission period. As a result of receiving the defined number of consecutive Ack communications, the base station 108 may select 912 enhanced MCS settings that have improved operational characteristics for the NTN station 102, as described elsewhere herein. Then the base station 108 may cause the NTN station 102 to transmit 914 signals according to the enhanced MCS settings. Thereafter, the method 900 returns to receive additional communications from the UE 104 and determine 908 whether the communications received are acknowledgement signals indicating successful signal transmission.

On the other hand, if it is determined in 910 that the number of consecutive Ack communications do not exceed the defined threshold, the base station 108 permits the NTN station 102 to continue transmitting 914 signals according to the selected MCS settings and determine 908 whether the communications received are acknowledgement signals indicating successful signal transmission.

With reference to 908, if an Ack communication is not received from the UE 104, the method 900 proceeds to determine 916 whether a number of consecutive NAck signals received exceeds a defined threshold K, herein K is a positive integer equal to or greater than one (1) and which may be less than the threshold implemented in connection with determining 910.

If the number of consecutive NAck communications received exceeds the defined threshold K, the method 900 proceeds back to 906 to cause the NTN station 102 to transmit signals according to the conservative MCS settings. Otherwise, if the number of consecutive NAck communications received is determined as failing to exceed the defined threshold K, the base station 108 selects 918 previous MCS settings for signal transmission to improve a likelihood that signal transmissions will be successfully received by the UE 104. The previous MCS settings may have diminished transmission characteristics, such as reduced transmission power or less effective modulation and channel coding.

Figure 10:
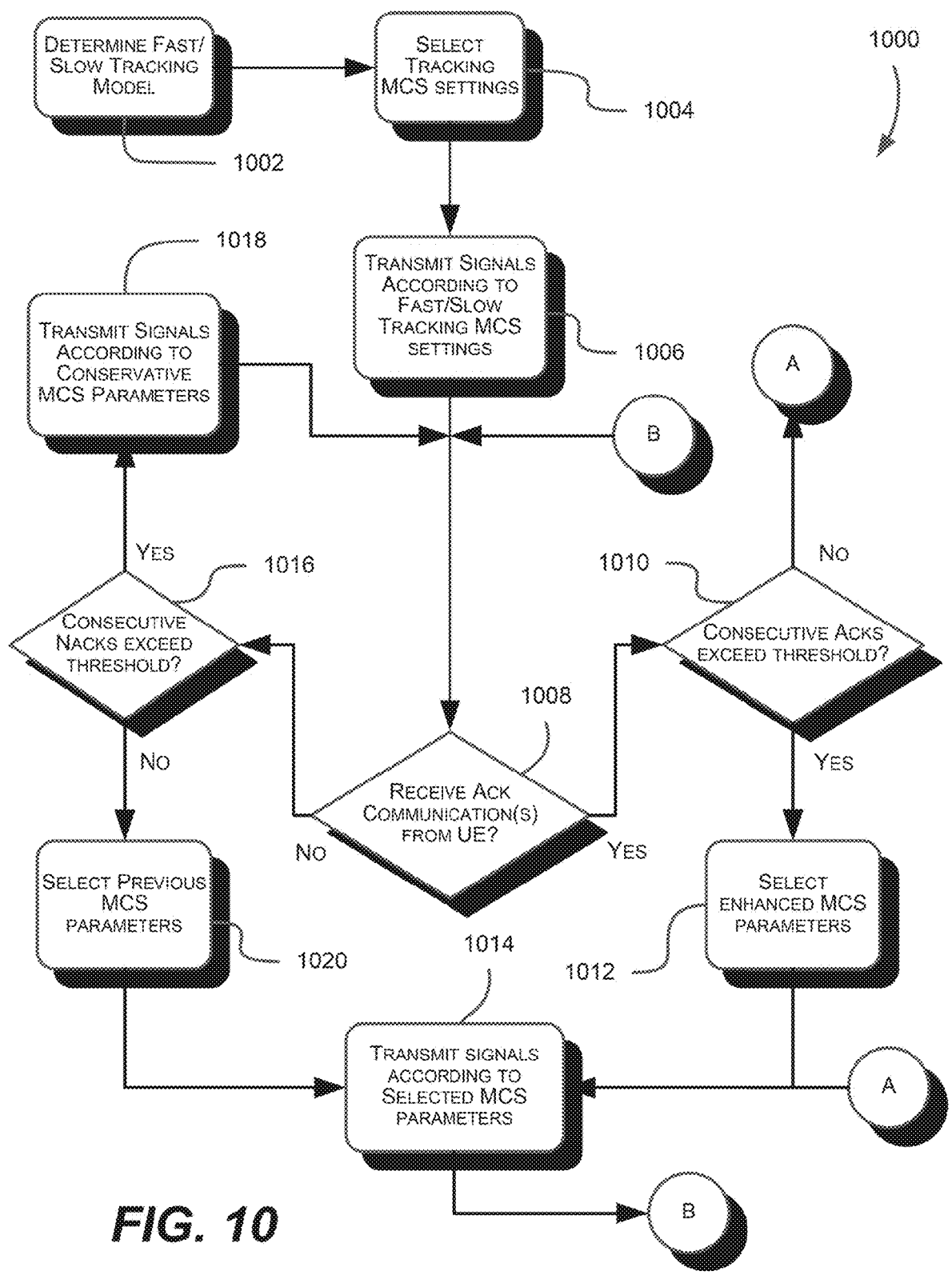
FIG. 10 is a flowchart of a method for adapting a communication link between the non-terrestrial network station and the user equipment of FIG. 1 according to one or more embodiments.

FIG. 10 shows a method 1000 of adapting communication link between the UE 104 and the NTN station 102 according to one or more embodiments. The method 1000 may be performed by the base station 108 in connection with communications with the UE 104 and the NTN station 102. The method 1000 is similar in many aspects to the method 900, so description of the method 1000 is minimized for brevity. The method 1000 includes determining 1002 a tracking model to implement for adapting the communication link. The tracking model determined in 1002, in some instances, may be the slow tracking model $SINR_{slow}$ of Equation 7, which deemphasizes fast changes in the communication link, thereby providing improved link adaptation characteristics over the conservative model $SINR_{con}$. The tracking model determined in 1002, in some instances, may be the fast tracking model $SINR_{Fast}$ of Equation 8, which accounts for estimates of both fast fading losses and shadow fading losses to track all changes in the communication link. Determining 1002 includes calculating the SINR for the model selected based on signals transmitted from the NTN station 102 to the UE 104, as described with respect to FIG. 3 and elsewhere herein.

Thereafter, the method 1000 includes selecting 1004 tracking MCS settings that correspond to the model determined in 1002 and the SINR calculated. The MCS settings are selected based on the SINR calculated, which may correspond to a particular CQI. For instance, the base station 108 may store in memory a table or array that specifies MCS settings that include a modulation setting and a channel coding setting for ranges of SINR values and/or ranges of CQI. The method 1000 proceeds to causing the NTN station 102 to transmit 1006 signals to the UE 104 according to the MCS settings selected.

The method 1000 includes determining 1008 whether Ack communications were transmitted by the UE 104 and received by the base station 108 in response to the signals transmitted in 1006. If so, the method 1000 includes determining 1010 whether a number of consecutively received Ack signals exceeds a defined threshold stored in the base station 108 that indicates that the selected MCS settings for signal transmission are stable and/or reliable during the signal transmission period. As a result of receiving the defined number of consecutive Ack communications, the base station 108 may select 1012 enhanced MCS settings that have improved operational characteristics for the NTN station 102, as described elsewhere herein. Then the base station 108 may cause the NTN station 102 to transmit 1014 signals according to the enhanced MCS settings. Thereafter, the method 1000 returns to receive additional communications from the UE 104 and determine 1008 whether the communications received are acknowledgement signals indicating successful signal transmission.

If it is determined in 1010 that the number of consecutive Ack communications do not exceed the defined threshold, the base station 108 permits the NTN station 102 to continue transmitting 1014 signals according to the selected MCS settings and determine 1008 whether the communications received are acknowledgement signals indicating successful signal transmission.

At 1008, if an Ack communication is not received from the UE 104 (i.e., a NAck communication is received), the method 1000 proceeds to determine 1016 whether a number of consecutive NAck signals received exceeds a defined threshold K, herein K is a positive integer equal to or greater than one and which may be less than the threshold implemented in connection with determining 1010.

If the number of consecutive NAck communications received exceeds the defined threshold K, the method 1000 proceeds to 1018 to cause the NTN station 102 to transmit signals according to the conservative MCS settings. Otherwise, if the number of consecutive NAck communications received is determined as failing to exceed the defined threshold K, the base station 108 selects 1020 the immediately preceding MCS settings for signal transmission to improve a likelihood that signal transmissions will be successfully received by the UE 104.

As a result of the method 1000, the NTN network can adapt the communication link to account for shadow fading losses and fast fading losses, and adjust the communication link to more conservative settings in response to degradation of the communication link. In some embodiments, the fast tracking model $SINR_{Fast}$ and/or the slow tracking model $SINR_{slow}$ may be intermittently updated by at least updating the shadow fading estimate $SF_E$ and/or the fast fading estimate $FF_E$.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
causing, by a base station, a first signal to be transmitted from a non-terrestrial station to user equipment during a first transmission time period;
receiving, by the base station, a communication indicating signal quality for a plurality of times during the first transmission time period;
obtaining, for the plurality of times, a plurality of fading losses associated with the first signal;
estimating, for a future time subsequent to the plurality of times, a shadow fading loss associated with the first signal by at least applying a first filter to the plurality of fading losses;
estimating, for the future time, a fast fading loss associated with the signal by at least determining differences between the plurality of fading losses and the shadow fading loss;
calculating signal-to-interference-plus-noise-ratio (SINR) that includes at least one fading loss selected from the shadow fading loss and the fast fading loss; and
causing the non-terrestrial station to transmit a second signal for a second transmission time period that includes the future time, the second signal having first settings for modulation and channel coding parameters, the first settings determined based on the SINR calculated.

2. The method of claim 1, wherein estimating the shadow fading loss includes applying a low pass filter to the plurality of fading losses for the plurality of times.

3. The method of claim 1, wherein estimating the fast fading loss includes applying a predictive filter to the differences determined between the plurality of fading losses and the shadow fading loss.

4. The method of claim 1, wherein estimating the fast fading loss includes applying a Kalman filter to fast fading losses for the plurality of times.

5. The method of claim 1, comprising:
receiving communications indicating successful receipt of a defined number of second signal transmissions during the second transmission period; and
causing, as a result of receiving the communications indicating successful receipt of the defined number of second signal transmissions, the non-terrestrial station to transmit a third signal to the user equipment according to third modulation and channel coding parameters for a third transmission period.

6. The method of claim 1, comprising:
receiving communications indicating successful receipt of a defined number of second signal transmissions during the second transmission period; and
causing, as a result of receiving the communications indicating unsuccessful receipt of the defined number of second signal transmissions, the non-terrestrial station to transmit a third signal to the user equipment according to previous modulation and channel coding parameters for a third transmission period.

7. The method of claim 1, wherein the SINR is calculated based on the shadow fading loss estimated and a conservative value for the fast fading loss.

8. The method of claim 1, wherein the SINR is calculated based on the shadow fading loss estimated and the fast fading loss estimated.

9. The method of claim 1, comprising:
calculating a conservative SINR value based on location information of the user equipment, the conservative SINR value based on a conservative value for the shadow fading loss and a conservative value for the fast fading loss;
receiving one or more communications indicating unsuccessful receipt of the second signal; and
causing, in response to receiving the one or more communications indicating unsuccessful receipt of the second signal, the non-terrestrial station to transmit a third signal according to settings for modulation and channel coding parameters selected based on the conservative SINR value.

10. A method, comprising:
calculating, by a base station, a shadow fading loss associated with signal transmission from a non-terrestrial station to user equipment for a first transmission period;
determining first modulation and channel coding settings based on the shadow fading loss;
causing the non-terrestrial station to transmit a first signal to the user equipment according to the first modulation and channel coding settings during the first transmission period;
receiving communications indicating whether the first signal was successfully received by the user equipment;
determining a fast fading loss that is different than the shadow fading loss; and
causing, in response to receiving the communications, the non-terrestrial station to transmit a second signal according to second modulation and channel coding settings different than the first modulation and channel coding settings during a second transmission period.

11. The method of claim 10, comprising:
receiving a communication indicating unsuccessful receipt of the second signal during the second transmission period; and
causing, in response to receiving the plurality of communications, the non-terrestrial station to transmit a third signal according to the first modulation and channel coding parameters during a third transmission period.

12. The method of claim 10, wherein the shadow fading loss calculated based on at least one estimated fading loss value.

13. The method of claim 12, wherein the at least one estimated fading loss value includes a shadow fading loss estimate obtained using a low pass filter.

14. The method of claim 10, wherein the at least one estimated fading loss value includes a fast fading loss estimate obtained using a predictive filter.

15. The method of claim 10, wherein the at least one estimated fading loss value is obtained by at least:
determining a set of fading losses for a plurality of times;
applying a low pass filter to the set of fading losses to obtain a first fading loss estimate;
calculating differences between the set of fading losses and the first fading loss estimate; and
applying a predictive filter to the differences to obtain a second fading loss estimate.

16. The method of claim 15, wherein the shadow fading loss includes the first fading loss estimate and the second fading loss estimate.

17. A communication system, comprising:
a receiver configured to receive communications from terrestrial user equipment and communications from a non-terrestrial network station;
a transmitter configured to transmit communications to the non-terrestrial network station;
one or more processors; and
memory storing instructions that, as a result of execution by the one or more processors, cause the communication system to:
  calculate a shadow fading loss associated with signal transmission from a non-terrestrial station to user equipment for a first transmission period;
  determine first modulation and channel coding settings based on the shadow fading loss;
  cause the non-terrestrial station to transmit a first signal to the user equipment according to the first modulation and channel coding settings during the first transmission period;
  receive communications indicating whether the first signal was successfully received by the user equipment;
  determine a fast fading loss that is different than the shadow fading loss; and
  cause, in response to receiving the communications, the non-terrestrial station to transmit a second signal according to second modulation and channel coding settings different than the first modulation and channel coding settings during a second transmission period.

18. The system of claim 17, wherein the memory stores instructions that further cause the communication system to:
  implement enhanced modulation and channel coding settings as the second modulation and channel coding settings in response to receiving communications indicating that a number of successfully received first signal transmissions by the user equipment exceed a defined threshold.

19. The system of claim 17, wherein the memory stores instructions that further cause the communication system to:
  implement diminished modulation and channel coding settings as the second modulation and channel coding settings in response to receiving communications indicating that a number of unsuccessfully received first signal transmissions by the user equipment exceed a defined threshold.

* * * * *